Oct. 22, 1963
E. R. SITZLER ETAL
3,107,451
FISHING FLOAT
Filed Jan. 15, 1962
2 Sheets-Sheet 2
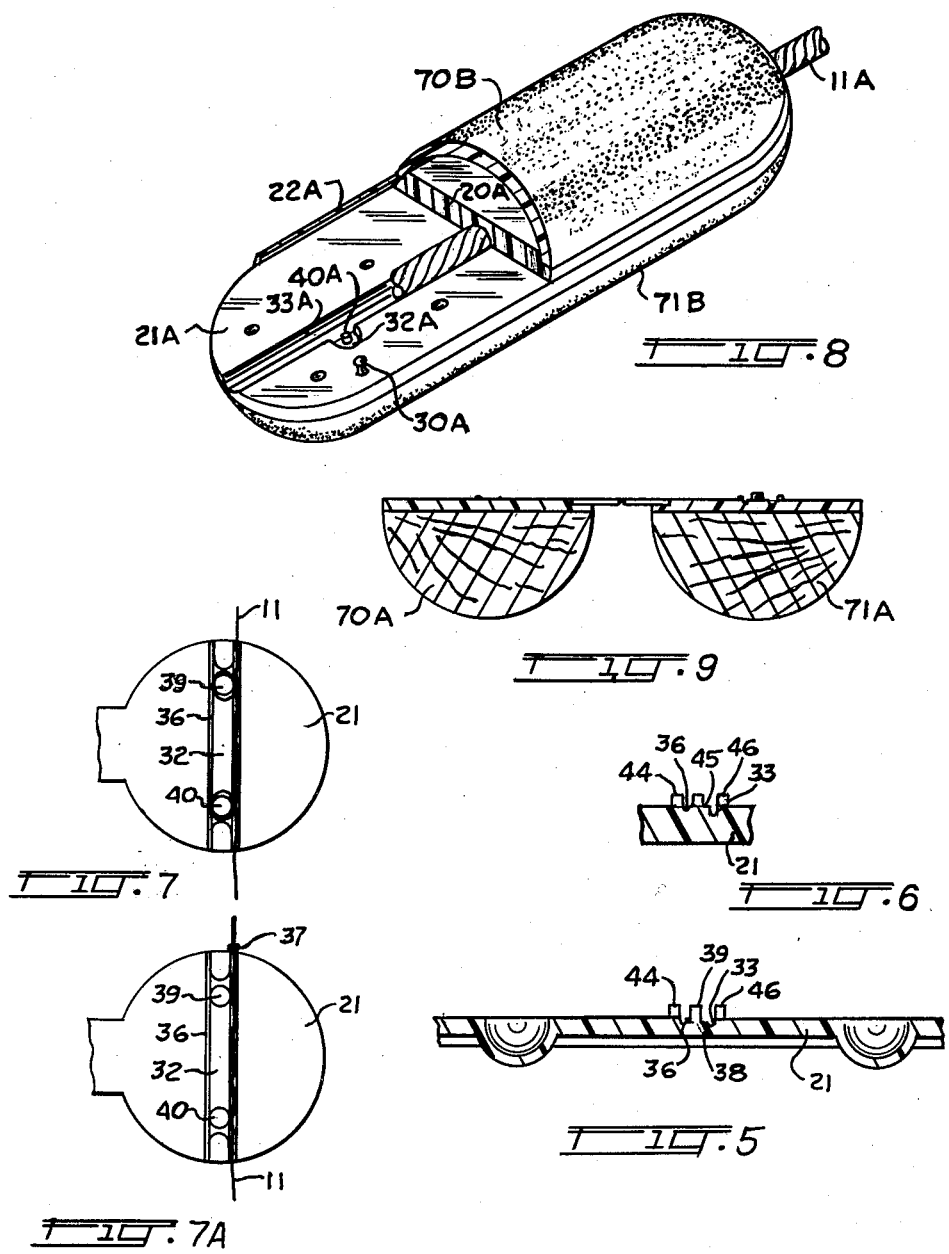
INVENTORS
EDWARD R. SITZLER
MELVIN C. LEHRING
BY  W. E. Sherwood
ATTORNEY

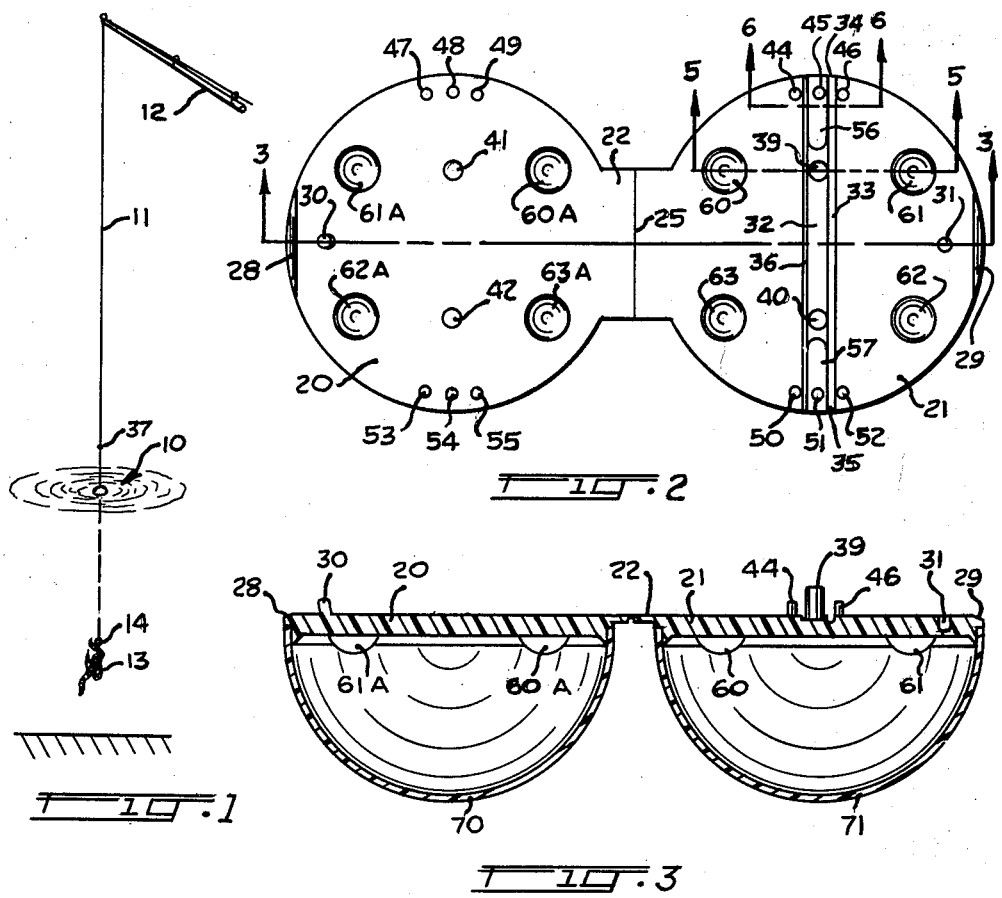

United States Patent Office 3,107,451
Patented Oct. 22, 1963

3,107,451
FISHING FLOAT
Edward R. Sitzler, 3402 Barber Lane, and Melvin C. Lehring, 4410 Nancy Lee Drive, both of Louisville, Ky.
Filed Jan. 15, 1962, Ser. No. 166,426
6 Claims. (Cl. 43—44.87)

The present application is a continuation-in-part of our copending application, Serial No. 129,801, filed August 7, 1961 and now abandoned, entitled Removable Float.

The advantages inherent in a hinged fishing float permitting ready attachment of the float to, or removal of the same from, a fishing line, are well known. Various types of hinged floats accordingly have been proposed and in which a separate hinge element and a separate latching element for holding the float in folded condition around the line are provided for cooperation with the remainder of the float structure. Despite the simplicity of these elements, however, certain practical problems are encountered in the production of a satisfactory float. For example, the float must possess the proper buoyancy and must ride in a properly stabilized condition in the water. When separate hinges and latching means must be affixed to the structure which gives buoyancy and stability to the float, a tedious and exacting process of manufacture is required and with concomitant addition to the cost of the final product. It is a purpose of our invention to overcome these and other practical problems which heretofore have confronted the manufacturer of such floats.

An object of the invention is to provide an improved fishing float which is readily attachable to, or detachable from, a fishing line and which possesses optimum buoyancy.

Another object is to provide an improved fishing float which is readily attachable to, or detachable from, a fishing line and which possesses an optimum stability for floating in the water.

A further object is to provide an improved hinged central partition element for a fishing float.

Other objects and advantages will become more apparent as the description proceeds and when considered in conjunction with the accompanying drawings in which:

FIG. 1 is a perspective view of the float employed with one form of fishing tackle.

FIG. 2 is a plan view of the float when fully opened and with the line removed therefrom.

FIG. 3 is a sectional view taken on line 3—3 of FIG. 2.

FIG. 4 is a detail sectional view to a larger scale taken across the hinge axis and with the partition in fully opened position.

FIG. 4A is a view similar to FIG. 4 and with the partition in fully closed position.

FIG. 5 is a detail sectional view taken on line 5—5 of FIG. 2 and to a larger scale.

FIG. 6 is a detail sectional view taken on line 6—6 of FIG. 2 and to a larger scale.

FIG. 7 is a diagrammatic view showing one arrangement for attaching a fishing line to the float.

FIG. 7A is a diagrammatic view showing a second arrangement for attaching a fishing line to the float.

FIG. 8 is a perspective view of a modified form of float embodying the invention, and FIG. 9 is a sectional view similar to FIG. 3 and showing a modified form of float embodying the invention and employing modified stabilizing members.

In accordance with the invention the float comprises a central partition having a hinge portion joining adjacent sides of two generally flat sections of the partition. These sections on their outer faces carry stabilizing members having a buoyancy sufficient to provide the optimum overall buoyancy for the assembled float, and in their inner faces include means for detachably latching the partition in a folded position and also means for removably attaching a fishing line to the float.

Referring first to FIG. 1, the float indicated generally at 10 may be employed with a conventional fishing tackle including a line 11 supported from a rod 12 and with the usual hook 13 and sinker 14 arranged on that line below the float. In its broader aspects, however, the invention is not limited to this form of tackle, but may be employed with commercial fishing apparatus as well, or even with floats not used in fishing. Moreover, such a float may take many shapes without being limited in any way to the spherical shape shown herein as a preferred example.

Considering now FIGS. 2 to 5, the invention in a preferred form comprises a float having a central partition element formed of a moldable thermoplastic resin having certain characteristics. Among these characteristics are an ability to resist flexing fatigue, an ability to spring back to normal position when deflected therefrom, and a relatively low specific gravity, preferably less than 1.0. Various known materials of the olefin resin family may be employed, but we prefer to use a polypropylene material since during the heat molding of the same to produce the partition element, now to be described, its molecular orientation in the important hinge portion is improved for carrying out the later hinging action of the float. Moreover, the specific gravity of polypropylene is about 0.89 to 0.90.

The partition element may be formed by known molding techniques in conventional molds and comprises a first section 20 and a second section 21 joined by a hinge portion 22. The confronting faces of the respective sections are symmetrically shaped with respect to each other so that with the partition in its folded position, the peripheries of the two sections will substantially coincide. With the exception of the structural features now to be described, the inner face and the outer face of the partition are generally flat and the thickness of the partition is generally uniform, thus to contribute to stability of the assembled float. As best seen in FIGS. 4 and 4A, the hinge portion 22 comprises a left hand plate 23 of reduced thickness and a right hand plate 24 of like reduced thickness joined to each other along an upper bend line 25 (FIG. 2) and with the upper faces of these plates lying in planes coinciding with the upper faces of the respective partition sections 20 and 21 and of which those hinge plates form an integral part. It is desirable that the hinge plates lie in contact with each other when the partition is fully closed, and the adjoining hinge plates accordingly are undercut to a sufficient extent as at 26, to permit this contact to occur. In general, when employing polypropylene material the thickness of the residual web joining the hinge plates above this undercut may be in the order of about 0.006–0.012 inch.

Thus when the float is ready for use, the hinge portion thereof will be folded into compact form as seen in FIG. 4A, and no interference with the latching of the float will result.

Various latching arrangements may be used, but we prefer to use an arrangement as seen in FIGS. 2 and 3 including a generally cylindrical projection or pin 30 molded integrally with the left hand section 20 and lying on a centerline of the partition which is normal to the hinge axis 25 and which is spaced at the greatest practical distance therefrom in order to achieve a maximum of leverage. Preferably, this pin is canted at a slight angle from the vertical and has a rounded upper tip. For cooperation with this pin a cylindrical recess 31 is formed in the other section 21 and with the axis of that recess substantially normal to the plane of partition section 21. As the partition is fully folded upon itself the rounded tip of the pin is cammed into the recess and as the pin is forced completely thereunto it is slightly bent, thus increasing its frictional hold in that recess. As will later appear, supplementary latching forming one function of the line-attaching projections also is provided. For the purpose of unlatching the partition, a pair of slightly beveled surfaces 28 and 29 may be molded into the partition when it is formed so that by inserting therein a fingernail or a small instrument such as knife blade, the two sections may be pried apart. As best seen in FIGS. 2 and 3, these beveled surfaces are located at the periphery of the sections respectively adjacent the pin 30 and the recess 31.

Referring now to FIGS. 2, 5 and 6, a line-attaching recess shown generally at 32 is formed in at least one of the partition sections, here shown as in section 21 and extends diametrically across the inner face thereof at a location providing optimum stability for the float. It is contemplated that the user of a given float may desire to employ it with lines of different diameters and accordingly the recess 32 may include adjacent one wall thereof a larger diameter groove 33 extending from an open end 34 for receiving the line 11 with an appropriate fit upon its entry into the float to an open end 35 for similarly receiving the line upon its departure from the float. Likewise, adjacent the other wall of the recess 32 a similar groove 36 but of smaller diameter is provided. It will be understood that the fit of the line 11 in the groove selected for its reception will be such as to provide for ready insertion and movement of the line in its groove, but to limit movement of the line in its groove, and in a downward direction, when a single knot 37, without an additional and separate bead member for the line being present, is tied in the line and comes into contact with the upper side of the float.

Between the respective grooves the recess 32 has a floor portion 38 lying below the upper face of the partition section 21, as best seen in FIG. 5, and with a substantial width so as to permit ready manipulation of the line therein during attachment of the same. Projecting upwardly from this floor is a pair of cylindrical posts 39 and 40 molded integrally with the floor and extending above the plane of the upper face of that partition section. These posts function as an optional snubbing means for the fishing line and also function as an additional latching means for the partition. Suitable recesses 41 and 42 accordingly are provided in the partition section 20 to receive these posts with a snug fit when the float is fully closed upon itself. Referring now to FIGS. 7 and 7A, the line 11 at the option of the user may be looped around one or both of the snubbing posts and when the float is closed, that float will then occupy a predetermined position above the hook and sinker; or the line 11 may be allowed during the casting to run freely through the float and the groove 33 or 36 occupied by the line and to have its final position above the hook and sinker determined by the engagement of knot 37 with the float.

It will be noted that projections or pins 39, 40 extend from partition section 21 and engage in holding recesses on the other section 20 while the projection 30 extends from section 20 and engages in a holding recess on section 21. Accordingly, regardless of the way in which the float is cast, the impact of the same upon the water will tend to force the hinged sections into tight latching engagement. This engagement, however, could be endangered if the line were permitted to slip from its groove and to force its way between the partition sections. We have found that this difficulty may be overcome by provision of a plurality of line-guiding posts located adjacent both the entry and exit of the line from the float and arranged to confine the line between adjacent posts in each of those regions. Conveniently, these posts are molded integrally with the partition section 21 and comprise an array of short posts 44, 45 and 46 engageable with a suitable fit in corresponding recesses 47, 48 and 49 in the other section 20. The inlet end of the groove 36 lies between posts 44 and 45 and the inlet end of groove 33 lies between posts 45 and 46. An array of similar posts 50, 51 and 52 with corresponding recesses 53, 54 and 55 to receive the same are disposed adjacent the outlet ends of the respective grooves. The central posts 45 and 51 preferably project outwardly from bosses 56 and 57 respectively which lie between the grooves and above the floor of the recess 32. These bosses have smoothly curved tips confronting the respective snubbing posts and spaced a suitable distance therefrom to permit easy looping of the line around such posts. By means of the described arrangement, the line is prevented from working its way, during casting or at other times, into the region between the confronting inner faces of the closed partition sections. Thus the function of the above described latching arrangement is preserved.

Since there may be occasions when the user desires the float to ride lower in the water, provision is made for optional addition of removable weights to the float. This may have the form of mating recesses molded into each of the partition sections and shown at 60, 60A; 61, 61A; 62, 62A and 63, 63A. These recesses are disposed in a symmetrical manner about the normally vertical and horizontal axes of the float and are adapted for reception or removal of weights (not shown) while the float partition is in its opened position.

Having thus described the structural and functional features of the improved float partition element it will be understood that buoyancy and stability is required to be added thereto in the composite float 10 as seen in FIG. 1. For this purpose the outer faces of the partition sections 20 and 21 are adapted to carry buoyant stabilizing members 70 and 71 and which may take various forms without departing from the invention. For example, as seen in FIG. 3 these members may comprise hollow air filled members attached at their peripheries to the partition sections, or as seen in FIG. 9 may comprise solid members 70A and 71A formed or cork, balsa wood or the like. In any event, the stabilizing members do not interfere with the flexing action of the hinge material and to insure this result, the members are spaced from each other sufficiently far when the float is in opened position to avoid detracting from the flexing action of the hinge material as the float is folded into its closed position.

As will be further evident, the invention is not limited to floats of spherical shape and as seen in FIG. 8 an elongated cigar-shaped float may be used, for example: In this modification, the line 11A may pass along a groove 33A formed in one partition section 21A and with that groove having one or more recesses 32A with a snubbing post therein, as indicated at 40A, for attachment of the line. By means of the improved hinge 22A of the type above described, the companion partition section 20A is assembled upon the section 21A. Latching means such as a plurality of projections 30A spaced lengthwise of the section 21A and engageable in recesses (not shown) in the other section 20A, are employed. In addition, buoyant stabilizing members 70B and 71B are carried by the outer faces of the respective partition sections 20A and 21A.

Having thus described the invention, various advantages of the same not found in the conventional hinged floats will be noted by those skilled in the art. The float possesses an inherent balance contributing to accuracy in casting, and is adapted for use with fishing lines of varied diameters and without necessitating the addition of beads to the line when cast with line movement through the float. In addition the customary features attributable to hinged floats are preserved and at the same time an inexpensive float is made possible due to the molding of the latches, hinge, and line-engaging means as an integral part of the partition element.

While we have shown and described particular embodiments of our invention, we do not desire the invention to be limited to the particular constructions disclosed, but rather we intend by the appended claims, to cover all modifications within the true spirit and scope of the invention.

What we claim as new and desire to secure by Letters Patent of the United States, is:

1. A hinged fishing float comprising a generally flat foldable central partition having a first section and a complementary second section of substantially the same thickness as said first section and a flexible hinge portion of reduced thickness formed integrally with the said sections and of the same material as said sections thereby joining the same together, said partition being foldable about a hinge axis located in said reduced thickness portion and being movable between an opened position affording access to a fishing line passing through said float and a folded position with said sections in contact with each other and restricting access to said line, one of said partition sections having a groove extending across the inner face thereof generally parallel to said hinge axis for receiving said line, said groove being of a size sufficient for positioning said line therein and without said line being clamped into contact with the face of the other partition section, one of said partition sections having a projection formed integrally therewith on its inner face and adapted for insertion with a frictional fit into a complementary recess on the inner face of the other partition section when said partition occupies its folded position thereby to latch said partition in said folded position, and a pair of buoyant stabilizing members carried by the outer faces of the respective partition sections, said stabilizing members when said float is in fully opened position being spaced out of contact with each other and sufficiently far from the hinge axis to avoid interference with the flexing action of said hinge when said float is moved to closed position.

2. A hinged fishing float comprising a central partition having a first section and a second section, and a hinge portion formed of the same material as, and integral with, the respective sections thereby joining the same together, said partition sections having generally flat inner faces adapted to contact each other with the partition in its folded position, one of said sections having a groove extending across the inner face thereof generally parallel to the hinge axis of said hinge portion and for receiving a fishing line, said groove having an inlet end and an outlet end at the peripheral edges of said one partition section and being of a size sufficient for positioning said line therein and without said line being clamped into contact with the face of the other partition section, means for confining said line against slippage transversely of said groove and including a plurality of posts integral with one of said partition sections and engageable in corresponding post-receiving recesses in the other of said partition sections when said partition is in folded position, at least one of said posts and one of said recesses being disposed on each side of said groove adjacent each of the inlet and outlet ends thereof when said partition is in folded position, one of said partition sections having a projection formed integrally therewith on its inner face and adapted to engage with a frictional fit into a complementary recess on the inner face of the other partition section when said partition occupies its folded position thereby to latch said partition in its folded position, and a pair of buoyant stabilizing members carried by the outer faces of the respective partition sections.

3. A hinged fishing float comprising a central partition having a first section and a second section, and a hinge portion formed of the same material as, and integral with, the respective section thereby joining the same together, said partition sections having generally flat inner faces adapted to contact each other with the partition in its folded position, one of said sections having an elongated recess across the inner face thereof and with a line-engaging post projecting upwardly from said elongated recess and adapted to be received in a complementary recess in the inner face of the other partition section with the partition in its folded position, said one partition section having a groove formed in said elongated recess generally parallel to the axis of said hinge portion and to one side of said line-engaging post, said groove having an inlet end and an outlet end at the peripheral edges of said one partition section and being of a size sufficient for positioning said line therein and permitting the snubbing of said line around said line-engaging post, means for confining said line against slippage transversely of said groove and including a plurality of additional posts integral with one of said partition sections and engageable in a plurality of additional corresponding post-receiving recesses in the other of said partition sections when said partition is in its folded position, at least one of said additional posts and one of said additional post-receiving recesses being disposed on each side of said groove adjacent each of the inlet and outlet ends thereof, when said partition is in its folded position, one of said partition sections having a projection formed integrally therewith on its inner face and adapted to engage with a frictional fit into a complementary recess of the inner face of the other partition section when the partition occupies its folded position thereby to latch said partition in said folded position, and a pair of buoyant stabilizing members carried by the outer faces of the respective partition sections.

4. A float as defined in claim 3 wherein said line-engaging post is formed upon a different partition section than said latching projection whereby the impact caused by casting of the float will tend to drive the partition sections into latching engagement.

5. For use in a hinged fishing float, a generally flat foldable partition of molded plastic material comprising a pair of complementary sections adapted to support buoyant stabilizing members on the outer faces thereof, a flexible hinge portion, the first of said sections being joined to the second of said sections by said flexible hinge portion formed integrally with and of the same material as said sections, said hinge portion including generally flat hinge plate surfaces on its inner most side lying in the same plane as the adjacent flat inner surfaces of said partition sections and having a bend line therebetween forming a hinge axis, said hinge portion being undercut on its outermost side and providing a web section adjacent said bend line having a thickness substantially less than that of the remainder of said hinge portion whereby said hinge may be folded upon itself upon flexing of said web portion in order to bring the confronting inner faces of said sections into contact with each other, one of said partition sections being provided with a groove extending parallel with said bend line for receiving a fishing line, and one of said partition sections having a projection formed integrally therewith on its inner face and adapted for insertion with a frictional fit into a complementary recess on the inner face of the other partition section when said partition occupies its folded position thereby to latch said partition in its folded position and with said web portion in stressed condition.

6. A float partition as defined in claim 5 and formed of polypropylene.

References Cited in the file of this patent

UNITED STATES PATENTS

| | | |
|---|---|---|
| 418,995 | Tufts | Jan. 7, 1890 |
| 1,176,631 | Wells | Mar. 21, 1916 |
| 1,240,043 | Gregory et al. | Sept. 11, 1917 |
| 2,461,833 | Mercier | Feb. 15, 1949 |
| 2,881,552 | Miller | Apr. 14, 1959 |
| 2,983,067 | Saywell | May 9, 1961 |
| 3,019,546 | Hansen | Feb. 6, 1962 |

FOREIGN PATENTS

| | | |
|---|---|---|
| 1,016,053 | Germany | Sept. 19, 1957 |
| 52,019 | Sweden | June 2, 1920 |